July 28, 1953  A. T. SCHEIWER  2,646,994

VALVED PIPE COUPLING

Filed June 18, 1949

INVENTOR
Albert T. Scheiwer
BY
Florian G. Miller
ATTORNEY

Patented July 28, 1953

2,646,994

UNITED STATES PATENT OFFICE 2,646,994

VALVED PIPE COUPLING

Albert T. Scheiwer, Erie, Pa.

Application June 18, 1949, Serial No. 100,061

3 Claims. (Cl. 284—18)

This invention relates generally to couplings and more particularly to snap action, swivel type, cam operated couplings.

It has heretofore been necessary in cam or ball type couplings to pull the locking sleeve on the female member out of engagement with the balls or cams to permit the insertion of the connecting portion of the male member into the female member. Attempts have been made in female coupling members having a check valve to interpose a sleeve intermediate the outer shell and the check valve of the female coupling member for holding the ball or cam members outwardly in the path of the locking sleeve on the female member when disconnected to permit the insertion of the connecting portion of the male member without operation of the locking sleeve on the female member but it was found that too many parts are required, the cost is excessive, and the flow of fluid through the female coupling member is excessively restricted. Machining operations on these prior couplings are complicated and costly.

It is, accordingly, an object of my invention to overcome the above and other defects in snap action couplings and it is more particularly an object of my invention to provide a snap action coupling with a check valve wherein connection may be made by merely inserting the connecting portion of the male member into the female member which is simple in construction, economical in cost, economical in manufacture, and efficient in operation.

Another object of my invention is to provide a novel check valve in a female coupling member which checks the fluid in a female member when it is disconnected and which also holds the ball or camming members outwardly in the path of the locking sleeve on the female member upon the disconnection of the female coupling member from the male coupling member.

Another object of my invention is to provide a coupling which may be connected together by merely inserting the connecting portion of the male member into the female member which has a minimum number of parts.

Another object of my invention is to provide male and female coupling members for a coupling which may be connected upon insertion of the connecting portion of the male member into the female member in which the machining operations thereon are greatly simplified.

Figure 1:
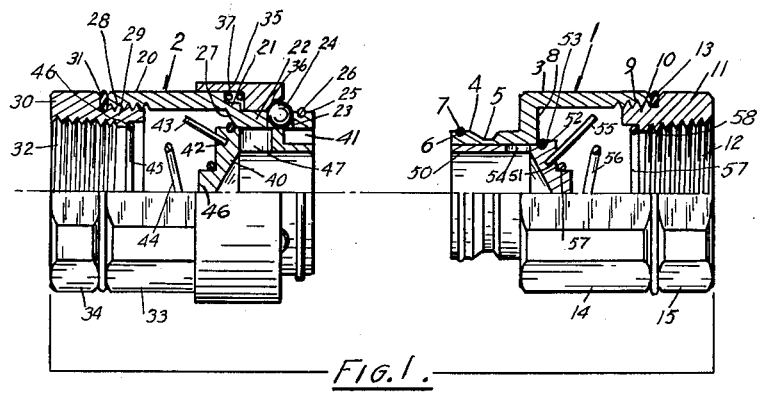
Figure 2:
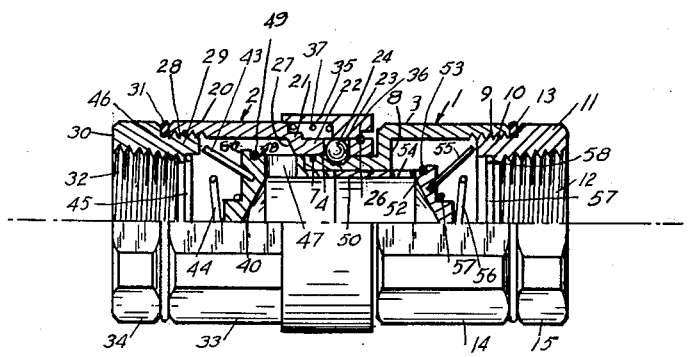

Other objects of my invention will become evident from the following detailed description, taken in conjunction with the accompanying drawings, in which Fig. 1 is an exploded side elevational view of the male and female coupling members of my novel coupling broken away on the center line thereof, each in a sealed disconnected position; and Fig. 2 is a side elevational view of my novel male and female coupling members broken away on the center line thereof in a connected position.

Referring now to the drawings, I show in Figs. 1 and 2 a male and female coupling member 1 and 2. The male coupling member 1 comprises a cylindrical tubular member 3 having a reduced connecting portion 4 with a peripheral groove 5, a peripheral groove 6 on the end thereof for receiving an annular end washer 7, an inner shoulder 8, and an inner threaded portion 9 for threadably engaging the threaded extension 10 of a connecting member 11. The connecting member 11 is internally threaded at 12 for threadable engagement with any suitable hose connection. A washer 13 is disposed between the end of the tubular member 3 and the connecting member 11. The tubular member 3 and the connecting member 11 have conventional wrench engaging portions 14 and 15 respectively formed on the outer sides thereof.

The female member 2 comprises a tubular member 20 having stepped portions 21 and 22, radially extending ball retaining apertures 23 carrying cams or balls 24, a peripheral groove 25 for receiving a blocking clip 26, an internal annular shoulder 27, and an internally threaded portion 28 for threadable engagement with the threaded end 29 of a connecting member 30. A washer 31 is disposed between the end of the tubular member 20 and the connecting member 30. The connecting member 30 is internally threaded at 32 for threadable engagement with any suitable hose coupling. The tubular member 20 and the connecting member 30 have the outer portions 33 and 34 thereof flattened to form a wrench engaging portion. A locking sleeve 35 having a camming portion 36 is telescopically disposed on the stepped portions 21 and 22 of the tubular member 20. The camming portion 36 of the locking sleeve 35 is urged against the balls 24 by a spring 37.

A cup shaped check valve 40 is telescopically disposed internally of the stepped portion 22 of the tubular member 20 and it has an annular cut away grooved portion 41 for receiving the end of the connecting portion 4 of the tubular member 3 of the male member 1. The check valve 40 has angularly extending, circumferentially spaced recesses 42 for receiving upwardly extending pins 43 to limit the longitudinal movement of the check valve 40, the pins 43 engaging the end of the extending portion 29 of the connecting member 30. A spiral spring 44 engages an extending portion 46 on the check valve 40 and nests in a peripheral groove 45 on the inner side of the threaded extension 29 of the connecting member 30. The check valve 40 has circumferentially spaced, radially extending apertures 47 for the flow of fluid between the male and female members 1 and 2 upon connection of the coupling members 1 and 2 as shown in Fig. 2. An annular groove 48 adjacent the outwardly directed flange 60 on the check valve 40 seats a ring washer 49 for sealing engagement with the inner shoulder 27 of the shell 20 when the female coupling member 2 is disconnected.

A cup shaped check valve 50 is telescopically disposed internally of the connecting portion 4 of the tubular member 3 of the male member 1 and it has circumferentially spaced, radially extending apertures 54 for the flow of fluid between the male and female members 1 and 2 when they are connected together as shown in Fig. 2. The member 50 has a groove 52 for receiving a ring washer 53 to sealingly engage the shoulder 8 of the tubular member 3. The member 50 also has angularly extending recesses 51 circumferentially spaced around the inner side of the member 50 for receiving pins 55 which limit the longitudinal movement of the check valve 50 when engaging the end of the extension 10 of the connecting member 11. A spiral spring 56 engages the extension 57 of the member 50 and the larger end thereof nests in a circumferential groove 58 in the extension 10 of the connecting member 11.

In describing the operation of my novel coupling, I will start from a locked position as shown in Fig. 2. The locking sleeve 35 is first moved against the force of the spring 37 until the camming portion 36 on the locking sleeve 35 frees the balls 24 and permits them to move out of engagement with the peripheral groove 5 on the connecting portion 4 on the tubular member 3 of the male member 1. The connecting portion 4 of the male member 1 is forced by spring 44 and check valve 40 from the female member 2, the spring 44 forcing the check valve 40 in the female member 2 to a position shown in Fig. 1 wherein the ring washer 49 sealingly engages the shoulder 27 in the tubular member 20. As the connecting portion 4 of the male member 1 moves out of engagement with the balls 24, the outer periphery of the member 40 engages the balls 24 and holds them outwardly in the path of movement of the locking sleeve 35 so that it is held in a position as shown in Fig. 1. As the male member 1 is forced out of the female member 2, the spring 56 urges the ring washer 53 into sealing engagement with the shoulder 8 in the cylindrical member 3 of the male member 1 thereby sealing the male member 1. The guide pins 43 and 55 on the check valves 40 and 50 respectively limit the longitudinal movement of the check valves 40 and 50 by providing a minimum resistance to the flow of fluid through the couplings 1 and 2.

In the connection of my novel coupling member, the connecting portion 4 of the male coupling member 1 is inserted in the grooved portion 41 of the check valve 40 and it is forced against the force of the spring 44 until the balls 24 are urged into the peripheral groove 5 on the connecting portion 4 of the male member 1 by the camming portion 36 of the spring urged locking sleeve 35. In this position, the radially extending apertures 47 in the check valve 40 clear the shoulder 27 in the shell 20 to permit the free flow of fluid through the female coupling member 2. The outer end of the check valve 40 engages the end of the check valve 50 in the male member 1 whereby it is forced rearwardly to a position wherein the apertures 54 in the check valve 50 clear the shoulder 8 in the tubular member 3 of the male member 1 to permit the free flow of fluid therethrough. It will be noted that the balls 24 are automatically locked in the peripheral groove 5 on the connecting portion 4 of the male member 1 by means of the spring urged locking sleeve 35 by merely inserting the connecting portion 4 of the male member 1 into the female member 2.

It will be evident from the foregoing description that I have provided a novel check valve for a female coupling member which acts to check the flow of fluid in the female coupling member when it is disconnected and also holds the balls or cams outwardly in the path of the locking sleeve so that the connecting portion of the male member may be inserted into the female member and a connection automatically made without any manual movement of the locking sleeve 35. Furthermore, machining operations are all very simple inasmuch as all parts are easy to get at and the cost of machining is greatly reduced. The same number of parts that is required for a conventional female coupling member wherein the locking sleeve must be manually moved for connection is necessary in my present novel coupling member. The connecting ends of the coupling members 1 and 2 are closed against dirt when disconnected and the sealing rings 49 and 53 and the shoulders 27 and 8 upon which they seat are protected against dust and dirt.

Various changes may be made in the specific embodiment of my invention without departing from the spirit thereof or from the scope of the appended claims.

What I claim is:

1. A coupling comprising a tubular male member having an external peripheral groove, a tubular female coupling member having a radially apertured, reduced, stepped portion, a cup-shaped check valve having radial apertures in the periphery thereof, and longitudinally slidable in the reduced portion of said female member, camming means disposed in said reduced portion apertures and engaging said peripheral groove, said check valve movable to hold said camming means in flush relation with the inside periphery of said reduced female portion, said check valve terminating in an external stepped end portion, said male member having a cup-shaped, radially apertured check valve therein, engaged by said female check valve, said tubular male member being received in said female member between the stepped portion of said female member and the outside of said check valve stepped portion whereby said female member check valve is moved out of engagement with said camming means and said male member check valve is moved telescopically in said male member.

2. The coupling recited in claim 1 wherein spaced pins are attached to said check valve movable into engagement with said female tubular member to limit the movement of said check valve.

3. The coupling recited in claim 2 wherein the male member has a second peripheral groove and a resilient ring in said second groove sealingly engaging the inside periphery of said female member.

ALBERT T. SCHEIWER.

References Cited in the file of this patent

UNITED STATES PATENTS

| Number | Name | Date |
|---|---|---|
| 137,823 | Button | Apr. 15, 1872 |
| 2,135,222 | Scheiwer | Nov. 1, 1938 |
| 2,299,193 | Trautman | Oct. 20, 1942 |
| 2,419,642 | Henry | Apr. 29, 1947 |
| 2,428,637 | Scheiwer | Oct. 7, 1947 |
| 2,461,700 | Scheiwer | Feb. 15, 1949 |
| 2,461,704 | Stranberg | Feb. 15, 1949 |
| 2,471,237 | Pasturczak | May 24, 1949 |